April 19, 1932.　　　C. E. DROEGE　　　1,854,370
VALVE
Filed Nov. 12, 1928
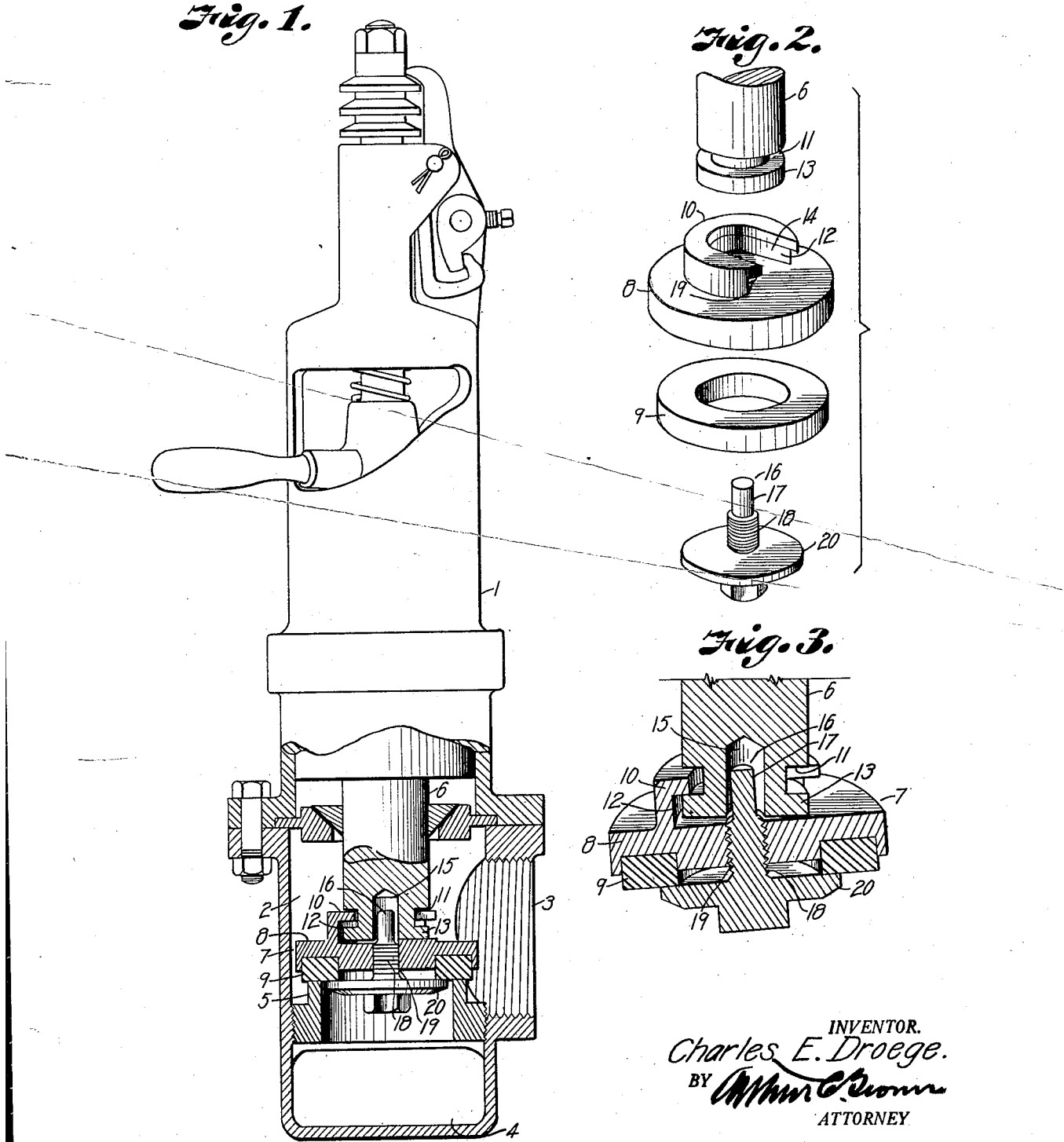
INVENTOR.
Charles E. Droege.
BY
ATTORNEY Patented Apr. 19, 1932

1,854,370

UNITED STATES PATENT OFFICE

CHARLES E. DROEGE, OF CUSHING, OKLAHOMA, ASSIGNOR OF ONE-HALF TO THOMAS H. MOSELEY, OF OKLAHOMA CITY, OKLAHOMA

VALVE

Application filed November 12, 1928. Serial No. 318,883.

My invention relates to valves, and more particularly to angle and globe valves having self aligning moveable valves mounted on the stems and adapted for easy removal for replacing compressible fibre members, the principal objects of the invention being to assure the efficient operation of valves of this character, and simplify their construction.

In devices of this character, the valve face support may be provided with a yoke slidable in an annular groove of the stem for slidably mounting the support on the stem, the fibre sealing ring being retained by the washer or flange of a bolt passing through and engaging the support. Means must be provided for preventing the yoke from slipping from the stem, and ribs are ordinarily formed on the support slidable in grooves of the casing, which may bind and prevent operation of the valve.

Further objects of my invention therefore are to latch the valve face support to the stem in such a manner that hazard of binding will be obviated, and to retain a fibre sealing member by means including the means for latching the support to the stem.

In accomplishing these and other objects of the invention, I have provided improved details of structure, the preferred form of which is illustrated in the accompanying drawings, wherein:

Fig. 1 is a vertical elevational view partly in section of a valve constructed in accordance with my invention.

Fig. 2 is a disassembled perspective view of valve parts.

Fig. 3 is a sectional perspective view of the parts shown in Fig. 2 in assembled position, illustrating the swiveling of the valve on the stem.

Referring in detail to the drawings:

1 designates a valve casing having a chamber 2, an outlet port 3 and an outlet port 4 for passage of fluid, 5 a metal ring seat in the chamber, and 6 a stem movable in the casing and illustrated as slidable therein for moving a movable self-adjusting valve member 7 into and out of engagement with the ring seat to control flow of fluid through the chamber.

The member 7 comprises a disk or face member 8 on which a fibre sealing member or ring is secured as later described, and a yoke-like bracket or hook 10 is fixed on the upper side of the disk or slidable mounting in a groove 11 in the stem adjacent its lower end. The inturned portion of the yoke 10 is spaced from the disk to form a recess 12 having slightly greater width than the width of the flange 13 formed on the stem by the provision of the groove, so that the disk may swivel or rock on the stem. The lateral opening 14 of the yoke is wider than the diameter of the stem at the groove, but narrower than the body of the stem, so that the yoke will retain the disk on the stem.

Ordinarily a bolt is extended through the disk from the stem side, and a nut is mounted on the outer face of the disk to retain the fibre ring, the disk then being provided with ribs or similar devices engaging suitably formed portions of the casing to prevent the yoke from moving laterally and slipping from the stem.

The above described structure represents one class of valves to which my invention may be applied and is selected for illustrative purposes and does not constitute part of my invention.

My invention consists chiefly in means for retaining the fibre sealing ring including means for latching the yoke against lateral movement away from the stem, as presently described.

A smooth axial socket or recess 15 is formed in the end of the stem, and a pin 16 having a smooth end portion 17 substantially less in diameter than the diameter of the recess is adapted for movable mounting in the recess and a portion 18 for engagement in an axial opening 19 provided in the disk, for securing the disk to the stem against lateral movement away from the stem. The pin preferably comprises a bolt, the portion 18 being screwthreaded, the bolt extending through the opening and being screwthreadedly engaged with the disk. A flange 20 mounted on the outer end of the bolt, is adapted to engage the fibre sealing ring, and is urged against the ring when the bolt is screw-threadedly advanced through the disk to advance the smooth end into the stem recess.

In using the device, the disk may be loosely and removably mounted on the stem by sliding the yoke into the stem groove. The bolt is then advanced through the disk opening, the flange engaging the inner portion of the fibre sealing ring and clamping the ring against the disk. The smooth end of the bolt lies loosely in the recess of the stem, permitting the disk to rock, and securing the disk against lateral movement away from the stem.

When it is necessary to remove the disk, for example for replacing the fibre sealing ring, the bolt may be removed, and the disk slidingly moved laterally from the stem.

What I claim and desire to secure by Letters Patent is:

1. In combination with a valve stem having an annular groove, a valve rockingly mounted on the stem including a valve face support having a hook spaced therefrom and loosely slidable into and out of the groove, and a removable sealing ring for mounting on the face support to engage a valve seat, means including a bolt having a threaded portion for engaging the face support, and a smooth portion freely movable in the stem, and a flange on the bolt engageable with the sealing ring, the stem being provided with a recess having greater diameter than the smooth end of the bolt and the face support being provided with a threaded opening to receive the bolt.

2. In a valve of the character described including a stem having an annular groove at its lower end and an axial socket in its lower end, a valve rockingly mounted on the stem having an axial threaded opening and an annular groove in its lower side, and provided with a yoke on its upper side including a flange freely movable in said stem groove for interlockingly engaging the valve with the stem, and a sealing ring in the groove of the valve, a retainer including a screwthreaded portion engageable in said threaded opening and a flange for retaining the sealing ring in the annular groove, said retaining member having a smooth end receivable in the stem socket reduced to substantially less dimension than the socket to permit the end to rock therein for latching the valve to the stem.
3. In a device of the character described including a stem having a flange and a socket in its lower end, an apertured valve having a hook on the upper side thereof engaging said flange and rockingly supporting the valve from the stem, a sealing ring on the lower side of the valve, and a bolt threaded in the aperture of the valve and having a reduced upper end rockingly received in the stem socket, and a flange on the outer end of the bolt engaged with the ring for clamping the ring to the valve.

In testimony whereof I affix my signature.

CHARLES E. DROEGE.